United States Patent
Putcha et al.

(10) Patent No.: US 10,679,170 B2
(45) Date of Patent: Jun. 9, 2020

(54) SYSTEMS AND METHODS OF CONTROLLING DELIVERY OF RETAIL PRODUCTS

(71) Applicant: Walmart Apollo, LLC, Bentonville, AR (US)

(72) Inventors: Sai Phaneendra Sri Harsha Viswanath Putcha, Bentonville, AR (US); Gary J. Delperdang, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 435 days.

(21) Appl. No.: 15/581,294

(22) Filed: Apr. 28, 2017

(65) Prior Publication Data

US 2017/0316370 A1 Nov. 2, 2017

Related U.S. Application Data

(60) Provisional application No. 62/329,396, filed on Apr. 29, 2016.

(51) Int. Cl.
*G06Q 10/08* (2012.01)
*G06Q 30/02* (2012.01)

(52) U.S. Cl.
CPC ....... *G06Q 10/083* (2013.01); *G06Q 30/0202* (2013.01)

(58) Field of Classification Search
CPC .... G06Q 10/08; G06Q 50/30; G06Q 10/0833; G06Q 10/087; G06Q 10/083;
(Continued)

(56) References Cited

U.S. PATENT DOCUMENTS 7,996,271 B2 8/2011 Chan
2001/0047285 A1* 11/2001 Borders ........... G06Q 10/06314
705/7.24
(Continued)

OTHER PUBLICATIONS

Davis, Don; "E-retailers dig out from another big winter storm"; https://www.digitalcommerce360.com/2015/02/02/e-retailers-dig-out-another-big-winter-storm/; Feb. 2, 2015; 3 pages.
(Continued)

*Primary Examiner* — George Chen
*Assistant Examiner* — Michelle E Carey
(74) *Attorney, Agent, or Firm* — Fitch, Even, Tabin & Flannery LLP

(57) ABSTRACT

In some embodiments, systems and methods are provided to enable product deliveries based on an interruption condition, comprising: a delivery scheduling system; a cancellation system; and a time reserving system; wherein the delivery scheduling system comprises a delivery scheduling control circuit configured identify that a delivery interruption condition exists for a delivery day; the cancellation system is configured to identify multiple scheduled product deliveries on the delivery day that are to be halted; the time reserving system is configured to: identify a non-interrupted second delivery day, and reserve at least a portion of the second delivery day; and block the reserved portion of the second delivery day and prevent previously unscheduled deliveries from being scheduled during the reserved portion; and the delivery scheduling control circuit is configured to reschedule a delivery of a halted product delivery during the reserved portion of the second delivery day.

16 Claims, 2 Drawing Sheets

(58) Field of Classification Search
CPC ......... G06Q 10/08355; G06Q 20/4016; G06Q 50/28; G06Q 10/063114; G06Q 10/06398; G06Q 10/0835; G06Q 30/0202
See application file for complete search history.

(56) References Cited

U.S. PATENT DOCUMENTS

| | | | |
|---|---|---|---|
| 2004/0068443 A1* | 4/2004 | Hopson | G06Q 10/02 705/5 |
| 2005/0125265 A1* | 6/2005 | Bramnick | G06Q 10/02 705/5 |
| 2009/0248527 A1* | 10/2009 | Strimling | G06Q 10/04 705/14.16 |
| 2012/0041675 A1 | 2/2012 | Juliver | |
| 2014/0046585 A1* | 2/2014 | Morris, IV | G01C 21/00 701/468 |
| 2014/0046716 A1* | 2/2014 | Black | G06Q 10/06314 705/7.19 |
| 2014/0279294 A1* | 9/2014 | Field-Darragh | G06Q 10/087 705/28 |
| 2014/0330738 A1 | 11/2014 | Falcone | |
| 2016/0140589 A1* | 5/2016 | Deshpande | G06Q 30/0205 705/7.34 |
| 2017/0149722 A1* | 5/2017 | Fernandez Acuna | H04L 51/32 |

OTHER PUBLICATIONS

Fishbowl; "Crazy Weather? No Problem with These 4 Supply Chain Solutions"; https://www.fishbowlinventory.com/articles/supply-chain-management/crazy-weather-no-problem-with-these-4-supply-chain-solutions/; Available as early as Apr. 22, 2016; 6 pages.

Prologistix; "Combating winter weather shipping delays"; http://www.prologistix.com/news/2016/1/40108891/Combating-winter-weather-shipping-delays; Jan. 27, 2016; 3 pages.

Steiner, Ina; "Amazon Beats eBay to Punch in Warning Sellers of Weather Delays"; http://www.ecommercebytes.com/C/blog/blog.pl?/p1/2014/1/1389018225.html; Jan. 6, 2014; 1 page.

Woollard, Darren; "Tips on how to prepare for bad weather disruptions to your supply chain"; https://www.dmg-freight.com/tips-prepare-bad-weather-disruptions-supply-chain/; Dec. 29, 2014; 6 pages.

* cited by examiner

SYSTEMS AND METHODS OF CONTROLLING DELIVERY OF RETAIL PRODUCTS

CROSS-REFERENCE TO RELATED APPLICATION

This application claims the benefit of U.S. Provisional Application No. 62/329,396, filed Apr. 29, 2016, which is incorporated herein by reference in its entirety.

TECHNICAL FIELD

This invention relates generally to controlling the delivery of products.

BACKGROUND

In a modern retail environment, there is a need to improve the customer service and/or convenience for the customer. One aspect of customer service is having products available for customers. Another aspect can be providing customers with options to have products delivered.

BRIEF DESCRIPTION OF THE DRAWINGS

Disclosed herein are embodiments of systems, apparatuses, methods and processes pertaining to controlling the delivery of retail products. This description includes drawings, wherein.

Figure 1:
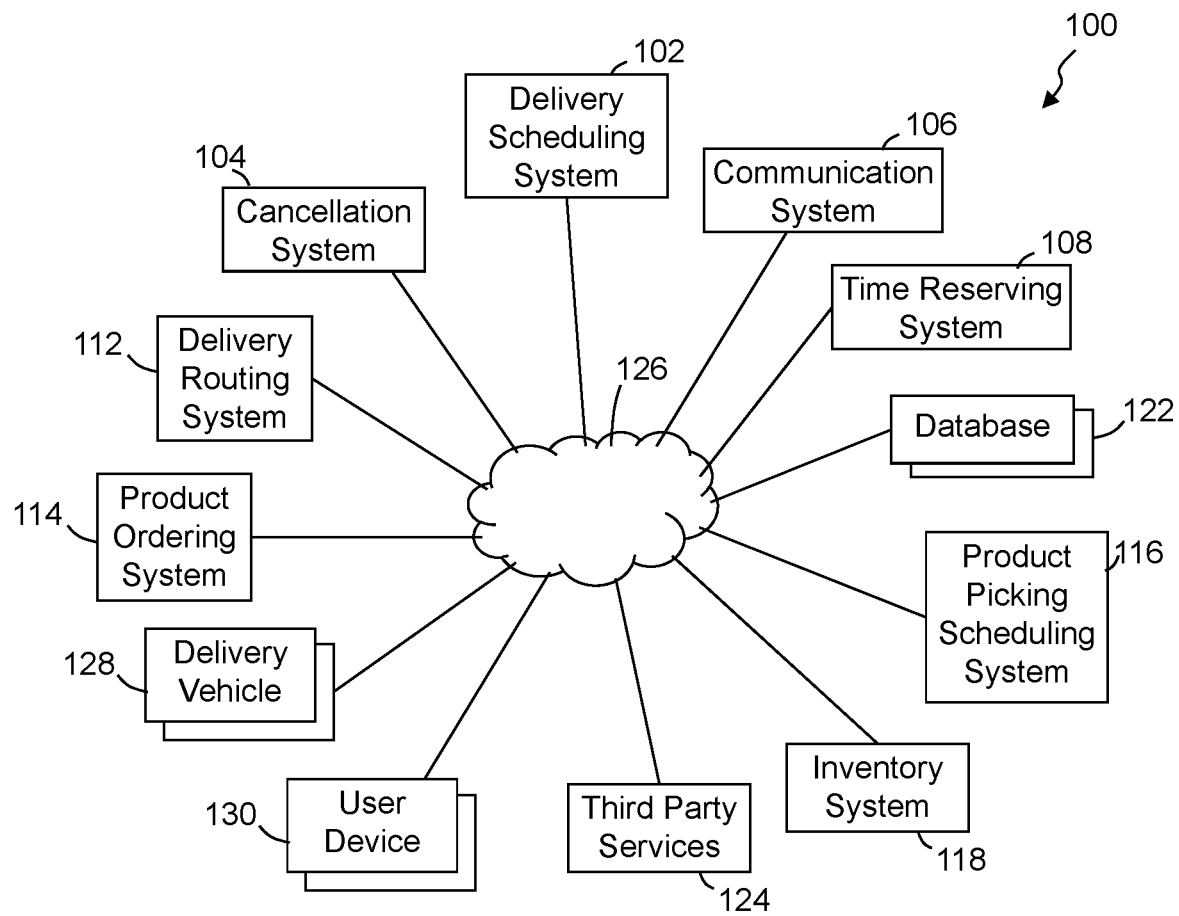
FIG. 1 illustrates a simplified block diagram of an exemplary delivery control system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses, methods and processes are provided herein to facility and/or control product deliveries. In some embodiments the system identifies that a delivery interruption condition exists for at least a subsequent first delivery day and corresponding to one or more retail shopping facilities. The interruption condition can be substantially any relevant condition that may cause the interruption of the delivery of products from a retail facility to customers. For example, some interruption conditions result when conditions make it unsafe to perform product deliveries on one or more days, and in some instances for part of a day. The system further identifies multiple scheduled product deliveries that are scheduled to be delivered from a retail shopping facility on the delivery day when the interruption condition is forecasted and/or is occurring. As a result of the interruption condition, the system further identifies and/or designates these scheduled product deliveries to be halted, suspended or cancelled. The system identifies one or more subsequent non-interrupted delivery days, which occur in time after the halted delivery day, and are forecasted to not have an interruption condition. At least a portion of the subsequent non-interrupted delivery day can be reserved to be available to allow customers associated with halted product deliveries to reschedule the halted product deliveries. Further, in some implementations, the system blocks the reserved portion of the subsequent non-interrupted delivery day and prevents previously unscheduled deliveries associated with the shopping facility from being scheduled during the reserved portion of the subsequent non-interrupted delivery day. The system can further reserve rescheduled deliveries of one or more of the halted product deliveries during the reserved portion of the subsequent non-interrupted delivery day based on communication from respective customers.

Other delivery scheduling systems do not have rescheduling capabilities to accommodate multiple and often large numbers of interrupted deliveries. Instead, many of these other previous scheduling systems require customers to settle for the rescheduling assigned by the delivery service. Still other systems may allow customers to reschedule, but typically the reschedule times are not optimal because other customers continue to reserve times and prevent customers that have had deliveries interrupted from selecting optimal times. Further, such other systems typically do not prioritize customers that have had deliveries interrupted, and typically do not prioritize rescheduled deliveries as a function of interruption and the types of products to be delivered. The present embodiments, however, improve rescheduling of product deliveries when relatively large quantities of deliveries are interrupted because of conditions within a geographic area, such as weather, natural disaster, forest fire, and the like. Further, some present embodiments reserve at least portions of one or more subsequent days or periods of time to be available to those customers that have had their deliveries interrupted so that these customers can obtain a desirable delivery time and receive their orders in a timely manner and in accordance with their schedules. This greatly improves customer satisfaction while also allowing the deliveries to be optimized at least in part for those customers that have had their deliveries interrupted.

FIG. 1 illustrates a simplified block diagram of an exemplary delivery control system 100, in accordance with some embodiments. The delivery control system includes one or more delivery scheduling systems 102 that are associated with one or more retail shopping facilities. Further, the system includes one or more cancellation systems 104, communication systems 106 and time reserving systems 108 communicatively coupled with the delivery scheduling system. In some implementations, the delivery control system 100 includes one or more delivery routing systems 112, product ordering systems 114, and/or a product picking scheduling system 116. Some embodiments may include and/or communicatively couple with one or more inventory systems 118, databases 122, third party services 124 (e.g., weather forecasting services, environment and/or atmosphere conditions reporting services, etc.), user computing devices 130, and the like. Typically, one or more computer and/or communication networks 126 establish communication connections between two or more of the components of the system 100 and components outside the system, and allow communications and/or data transmissions between two or more of the components of the system 100 and/or outside the system. For example, the network may include one or more local area networks (LAN), wide area networks (WAN), the Internet, cellular networks, local wireless networks, and/or other such communication and/or computer networks. The system 100 further includes and/or is in communication with one or more delivery vehicles 128 that can communicate status information, location information, completed delivery information, and/or other such information.

The delivery control system 100, in some embodiments, is geographically distributed over multiple geographic areas, with multiple delivery scheduling systems 102, cancellation systems 104, communication systems 106, time reserving systems 108 and/or other systems further distributed across two or more of the geographic areas. This distribution provides a geographically distributed system, while further providing distributed processing and data storage. Further still, the geographic distribution of the delivery control system 100 provides redundancy, and/or duplicity. In some embodiments, one or more of the systems and/or databases 122 and/or portions of the data maintained in the databases are duplicated to enable multiple sources of access while providing redundancy in an event of one or more failures. The geographic distribution and redundancy can be particularly advantageous when conditions within a geographic area cause a portion of the delivery control system 100 to fail or operation be temporarily interrupted, such as from a natural disaster, failure of local infrastructure, and the like.

The delivery scheduling system 102 is configured to receive a notification and/or identify when a delivery interruption condition exists. The notification may be received from a remote central system that tracks weather conditions, emergency conditions, receives notifications from emergency services or other third party services 124, and the like. Additionally or alternatively, the identification can be based on the delivery scheduling system evaluating current conditions (e.g., current weather conditions, current emergency situations, status of emergency conditions, etc.), forecasted conditions (e.g., forecasted weather conditions, forecasted emergency events, forecasted emergency situations, etc.), and/or other relevant information. In some instances, the delivery scheduling system accesses information from one or more sources, such as weather services, emergency response agencies, government agencies, other such sources, and often a combination of two or more of such sources. Further, the delivery scheduling system may receive forecasting information, may receive notifications from a central system (e.g., a central system of a chain of retail stores), may receive notifications from government agencies and/or emergency services (e.g., government road services, fire departments, police departments, etc.), or other such sources. Using this information, the delivery scheduling system can access one or more rules databases 122 and apply one or more cancellation rules to identify when a delivery interruption condition exists. For example, the delivery scheduling system may receive forecasted weather data that forecasts based on one or more applied rules a threshold level of snow. The threshold may be specified by a government agency, historic data (e.g., levels of snow that are readily handled by street crews, historic requests by government agencies that people not use the roads, etc.). As another example, the delivery scheduling system may receive a weather warning from a government agency requesting that people avoid traveling on the roads. Similarly, one or more rules may be applied based on historic road conditions relative to weather conditions, historic accident reports relative to weather conditions, etc. In some embodiments, the rules when applied provide results that are inconsistent with other delivery systems. Because the delivery control system 100 improves the ability to subsequently deliver products, the delivery control system can apply rules that would define a day or portion of a day as an interruption condition when other systems would continue to attempt to complete deliveries. Accordingly, the delivery control system improves worker safety as well as the safety of the public at large because the system has the ability to set lower thresholds of when an interruption condition exists, yet still providing customers the ability to readily reschedule their interrupted deliveries and thus improve customer satisfaction.

When the interruption condition exists, the delivery scheduling system notifies the cancellation system 104, which is configured to access one or more rules and/or rules databases and evaluate scheduled deliveries relative to one or more estimated times of delivery interruption relative to one or more rules of a set of cancellation rules to determine whether such conditions are predicted to interfere with scheduled delivery of products to customers from one or more brick and mortar retail and/or shopping facilities. The retail and/or shopping facility may be a retail sales facility, a fulfillment center, a distribution center, or any other type of facility in which products are sold and/or distributed to customers. The facility may be any size or format, and may include products from one or more merchants. For example, a facility may be a single store operated by one merchant, a chain of two or more stores operated by one entity, or may be a collection of stores covering multiple merchants.

Again, the interruption condition may be associated with one or more shopping facilities. Typically, such interruption conditions are limited to one or more geographic areas (e.g., a county, a state, a region). Further, the delivery scheduling system 102 evaluates the interruption condition in accordance with one or more rules and relative to one or more subsequent or future delivery days. For example, the delivery scheduling system can identify at 11:00 PM on a Monday that forecasted and/or current weather conditions are going to exceed one or more thresholds corresponding to conditions that are expected to prevent or make it difficult for delivery vehicles to transport products and/or road conditions are expected to be unsafe to perform product deliveries on the next day (i.e., Tuesday in this example). As another example, the delivery scheduling system can identify at 1:00 AM on a Thursday that forecasted road conditions are expected to have a predefined relationship with one or more thresholds corresponding to the roads expected to be unsafe to perform product deliveries scheduled for the subsequent business day (i.e., during the day on Thursday in this example). Again, in some instances, the applied rules may result that are inconsistent with many other delivery services, and can further provide a greater degree of caution over other delivery services because the delivery control system 100 provides for the improved subsequent reserving of delivery times for those customers that have had their deliveries interrupted.

When the delivery scheduling system 102 identifies an interruption condition that is going to adversely affect the delivery of some or all of the products during a scheduled day. The delivery scheduling system 102 can notify the cancellation system 104 providing a geographic area in which the interruption condition exists. The cancellation system 104 is configured to access one or more scheduled delivery databases that maintain delivery information for multiple different scheduled deliveries, and apply one or more rules of a set of cancellation rules and process scheduled deliveries relative to the geographic area to identify multiple scheduled product deliveries that are scheduled to be delivered from the one or more retail shopping facilities on the scheduled delivery day (or during a part of the day). The scheduled delivery database can be maintained and/or updated by the product ordering system 114 in response to receiving an order, the delivery scheduling system 102 in organizing and scheduling deliveries based on the different orders, and/or other systems. Further, the scheduled delivery database maintains information about products to be delivered and may further include customer information and/or corresponding links to relevant customer information in one or more customer databases, which can store customer identifying information, one or more delivery addresses, payment methods, delivery preferences, and/or other such information.

In some embodiments, the cancellation system 104 is further configured to halt or interrupt the identified scheduled product deliveries as a result of the interruption condition. In some instances, the cancellation system 104 and/or the delivery scheduling system 102 notifies the time reserving system 108, one or more other components of the delivery control system 100 and/or other entities outside of the system that one or more days or a portion of one or more days is designated as an interruption condition day or portion of a day. Further, the cancellation system 104 identifies a customer associated with each of the interrupted product deliveries, and provides customer identifying information to the communication system 106.

The communication system 106 is further configured to access customer information to identify one or more methods of communication by which each respective customer prefers to receive communications regarding their deliveries and/or product orders. The communication system, in some embodiments, includes one or more control circuits and/or systems communicatively coupled with multiple communication transceivers each configured to communication in accordance with one or more communication methods (e.g., Internet, Wi-Fi, cellular, land-line telephone, RF, and/or other such methods). In some instances, for example, customers may prefer to receive communications as a text message, an alert through a shopping facility software application (APP) implemented on their customer computing device 130 (e.g., smartphone, tablet, smart wearable device (e.g., smart watch, smart glasses, etc.), worker devices (e.g., bar code scanner system, RFID tag reader, etc.) and the like), email, phone call, and/or other such methods of communication. Based on the identified preferred method of communication, the communication system 106 implements a notification to be communicated to the customer regarding the interrupted scheduled product delivery. In some embodiments, delivery scheduling system 102 directs the communication system to communicate the notification, while in other instances the communication system notifies the delivery scheduling system of the preferred method of communication and the delivery scheduling system initiates the communication of the notification. In some implementations, the communication system includes one or more text messaging systems, email services and/or accounts, directs a web server to modify a web page, and/or other such systems.

Based on the interruption condition, the time reserving system 108 is configured to apply one or more rules of a set of time reserving rules to identify one or more subsequent non-interrupted delivery days or portions of such days that occur in time after the interrupted delivery day and that are forecasted to not be an interrupted delivery day such that deliveries are expected to be performed during those days or portions of those days. For example, if Tuesday is identified as an interrupted delivery day based on weather conditions, Wednesday may be identified as a subsequent non-interrupted delivery day when it is forecasted that Wednesday will not be an interrupted delivery day (e.g., forecasted weather conditions are within one or more threshold levels such that deliveries are expected to commence on Wednesday). The time reserving system 108 further reserves at least a portion of the identified subsequent non-interrupted delivery day to be available to allow customers associated with halted product deliveries to reschedule the halted product deliveries. Again, the time reserving system 108 operates different than other delivery services in that the reserving system limits and/or prioritizes subsequent times to be available to those customers that have had deliveries interrupted, while still maintaining some times for other customers that have not had deliveries interrupted. As such, the reserving system improves customer satisfaction while enhancing delivery capabilities.

Again, in some embodiments, the delivery scheduling system 102, the communication system, the time reserving system 108, the product ordering system or other customer service system, causes a notification to be communicated to a customer associated with each of the multiple halted product deliveries, and provides access through the delivery scheduling system 102 to a delivery schedule that identifies available times that can be reserved or selected by the customer in rescheduling the halted product delivery. The notification that a customer's delivery has been halted can be through a text message, an email, an alert provided through a software application (APP) on a customer's electronic device 130 (e.g., smartphone, tablet, laptop, computer, etc.), an alert provided through a webpage associated with the retail shopping facility, a telephone call, other such communication methods, or combination of two or more of such communication methods. In some instances, some customers may receive multiple notifications (e.g., a text message, and a notification through an APP).

In some embodiments, the time reserving system further blocks at least the reserved portion of at least one subsequent non-interrupted delivery day and prevents other customers that are trying to schedule previously unscheduled deliveries from the shopping facility from being scheduled during the reserved portion of the subsequent non-interrupted delivery day. By blocking the reserved period, the reserved period is maintained to be available to service those customers that had their deliveries interrupted. The time reserving system 108 and/or the delivery scheduling system 102 may subsequently open some or all of the reserved portion of the subsequent non-interrupted delivery day after one or more threshold number of customers whose deliveries were interrupted have rescheduled for the subsequent non-interrupted delivery day or another day, or cancelled their delivery. In some embodiments, customers are provided access to a user interface that allows the customer to see available times and select a desired delivery time. The interface may be provided as part of the notification of the halted delivery, accessed through an APP, accessed through a web page link that is supplied in a notification (e.g., in a text or email), accessed through a web page associated with the shopping facility, or the like.

Based on a communication from a customer, the delivery scheduling system 102 reschedules a delivery of at least the halted product delivery during the reserved portion of the subsequent non-interrupted delivery day or another day as requested by the user. In some embodiments, the delivery scheduling system applies one or more scheduling rules to confirm the requested delivery time is still available and/or is consistent with one or more limiting factors such as, but not limited to, whether the delivery location is within a threshold distance of one or more other scheduled deliveries scheduled before or after the requested time, quantities of delivery vehicles, quantities of products to be delivered, expected delivery routes, and/or other such factors.

In some instances, the communication from the customer requesting a rescheduled delivery time and/or location is received through a user interface of an APP, a user interface accessed through a web page, communicated over the telephone between the customer and a shopping facility representative, or other such communication. The delivery scheduling system can confirm an identification of the customer, confirm the halted delivery is associated with the customer, and allow the customer to reschedule (e.g., select from one or more available delivery times). In some implementations, the customer may be allowed to modify through the rendered user interface the products being delivered by adding and/or removing one or more products. For example, the user interface may provide the customer with an option to modify the product order, which can in some instances provide a listing of the products to allow the customer to select one or more products to be removed from the delivery, and/or provide an option to access information about other available products that may be added to the delivery (e.g., through a shopping interface website of the shopping facility, which may receive information from the inventory system). In some instances, the customer is routed to the product ordering system 114 when the customer wants to modify the delivery, and the product ordering system 114 can obtain the modifications and adjust delivery orders. Selected products can be added to the rescheduled delivery, and in some instances, workers are notified of the modification so that previously picked products corresponding to the halted delivery can be modified to remove one or more products and/or add one or more products.

In some embodiments, the delivery control system 100 may attempt to optimize deliveries and/or improve customer service. Often, when deliveries have to be halted and rescheduled to one or more subsequent non-interrupted days, the number of deliveries to be performed on the subsequent non-interrupted delivery day is greater than a typical day because of the deliveries that were already scheduled for the non-interrupted delivery day prior to the interruption condition. Accordingly, in some instances, the delivery scheduling system may attempt to optimize deliveries by highlighting and/or restricting rescheduling times when one or more deliveries are already scheduled or have been rescheduled that are within threshold distances of the customer rescheduling, within a threshold distance between a route between two already scheduled and/or rescheduled deliveries, and the like. The delivery scheduling system may, in response to a notification of a particular customer initiating a rescheduling process, evaluate currently scheduled and rescheduled deliveries relative to a delivery location of the particular customer in identifying optimal delivery times and/or restricting times that the customer may selected and/or be provided as an option from which to select.

Similarly, some embodiments in allowing customers to reschedule the halted deliveries may limit the available rescheduling times based on the customer's specified delivery location. In some instances, for example, the delivery scheduling system may apply one or more scheduling rules to divide a geographic area or areas into two or more zones, and limit available rescheduled delivery times based on these zones. These rules provide scheduling that is different than other previous delivery systems because the rules take into consideration previously scheduled deliveries, and in many instances with rescheduling accommodates the need to increase the number of deliveries that can be accommodated while prioritizing customers that have had deliveries interrupted. For example, the delivery scheduling system may apply one or more rules to define multiple different geographic delivery zones and assign one or more limited delivery periods of time to one or more of the geographic delivery zones. The number and/or duration of these limited period of time can be dependent on relative sizes of zones, numbers of products to be delivered in each zone, zone priorities, types of products to be delivered to the different zones, number and/or type of delivery vehicles available, and/or other such factors. In some instances, for example, a delivery location that is within a first zone may be is limited to a first period of time (e.g., between 9:00 am-11:30 am), while a delivery location that is within a second zone may be limited to a second and third period of time (e.g., 12:00-2:00 pm and 4:00-6:00 pm). In some embodiments, the delivery scheduling system identifies a delivery location associated with a customer, and limits delivery times available to that customer in rescheduling the delivery of the halted product delivery to a sub-portion of the reserved portion of the subsequent non-interrupted delivery day as a function of the delivery location. This can allow the delivery scheduling system to concentrate the rescheduled deliveries based on geographic areas, pre-established delivery routes, optimize delivery routes, and/or the like. Similarly, by limiting available rescheduling times the system can in part control delivery timing, increase the number of products that can be delivered, increase the number of product deliveries that can be completed, and other such benefits.

As described above, some embodiments notify customers, typically when rescheduling and/or scheduling delivery, of one or more deliveries and/or delivery times previously scheduled for a delivery near a customer's delivery location. In some implementations, the delivery scheduling system can identify when a customer's delivery location is within one or more threshold distances from a location of one or more previously scheduled or rescheduled delivery times, within a threshold distance of a pre-established or predicted delivery route, or the like. The customer can be notified of one or more delivery times that correspond to another delivery previously scheduled for a second delivery location that is within a threshold distance of the customers' delivery location. In some instances, the customer is provided a user interface that lists available delivery times that correspond with delivery times that are within a threshold distance from the customer's delivery location. The delivery times can be dependent on the distance between the delivery location and the other delivery location, expected travel times, quantities of products to deliver, and/or other such factors.

Further, some embodiments may present one or more incentives to the customers encourage them to select a delivery time that corresponds with a delivery already scheduled that is within the threshold distance from the customer's delivery location (e.g., free delivery, coupons, discount on subsequent delivery, other such incentives, or a combination of two or more of such incentives). For example, the delivery scheduling system 102 and/or the delivery routing system 112 may detect that a customer that is rescheduling a halted delivery is with a threshold distance of another scheduled delivery, a scheduled delivery route, etc., and can include in the user interface accessed by a customer in rescheduling a halted delivery an indication (e.g., a displayed green leaf, a banner, a pop-up, or the like) that there is already a scheduled delivery near the customer's delivery location. Further, the notice or indicator may further display potential incentives and/or one or more incentives may be displayed when the customer activates an option (e.g., selects the "green leaf" indicator). The rescheduling may be through a notification of halted deliveries. A notification can be communicated by the communication system 106 to a customer associated with each of the multiple halted product deliveries, and provided with access to a schedule identifying available times for rescheduling the halted product delivery.

As described above, the time reserving system 108 can reserve at least a portion of one or more subsequent non-interrupted delivery periods and/or days to be available for rescheduling halted deliveries. Typically, however, one or more deliveries to be delivered during those subsequent non-interrupted days were previously scheduled prior to the existence of the interruption condition and the halting of the deliveries. As such, the time reserving system 108 typically reserves portions of time and the delivery scheduling control circuit in rescheduling the delivery of halted product delivery typically reschedules the delivery of the halted product deliveries without adversely affecting previously scheduled product deliveries that are scheduled for the subsequent non-interrupted delivery day and that were scheduled prior to the identifying that the delivery interruption condition existed. In some instances, the delivery scheduling system 102 can identify the customers associated with existing scheduled deliveries on the subsequent non-interrupted delivery day and may direct the communication through the communication system 106 in attempts to incentivize those customers to modify their delivery time and/or day (e.g., to shift to be consistent with a rescheduled delivery time when within a threshold distance). In some embodiments, the delivery scheduling system 102 applies one or more rescheduling rules to identify potential customers with existing scheduled deliveries during subsequent non-interrupted days. The delivery scheduling system can evaluate the types of products scheduled for delivery, a customer's likely willingness to allow for rescheduling, a customer's likelihood of being incentivized to reschedule, and the like. Further, the delivery scheduling system can estimate the number of rescheduled deliveries attempted to be reserved in the subsequent non-interrupted days (e.g., based on historic rescheduling, customers' demands, types of products, etc.), in attempts to determine whether and how many existing reserved deliveries during the one or more non-interrupted days that would be beneficial to reschedule. The application of these rules and/or considerations is inconsistent with other delivery services, at least in part, because other delivery services fail to identify those customers that can more easily absorb rescheduling and/or that are more likely to be incentivized.

In some embodiments, the time reserving system 108 determines an amount of one or more subsequent non-interrupted delivery days and/or a number of subsequent non-interrupted delivery days that is to be reserved to reschedule the halted product deliveries. In some implementations, the time reserving system applies one or more time reserving rules to evaluate historic data in predicting a number of halted deliveries that are likely to be rescheduled. For example, the historic data can be used to determine an average, mean, percentage, average percentage, and/or other relevant parameters corresponding to the historic number of customers that reschedule halted product deliveries. This evaluation may further take into consideration other historic factors, such as the number of halted deliveries, types of interruption events, the number of days of interruption, time of year of an interrupted event, types of products ordered for those deliveries that were interrupted, types of products ordered for those deliveries that have not yet been or were not rescheduled, and other such relevant information. Further, the delivery scheduling system can evaluate these parameters relative to the number of the multiple halted product deliveries in the current interruption event. For example, the system may evaluate historic product demand of one or more products prior to and/or following one or more similar types of event that correspond to the interruption event. Further, the time reserving system may identify types of products likely to be in more demand based on the type of interruption event, and give greater weight to those interrupted deliveries that include those products as more likely to be rescheduled as soon as possible.

Some embodiments take into consideration the ability of the shopping facility to prepare products for delivery on the one or more subsequent non-interrupted days following the interruption event. In some embodiments, the delivery scheduling system 102 and/or the product picking scheduling system 116 in cooperation with the delivery routing system 112 can evaluate a state of preparation of products for each delivery scheduled for a subsequent non-interrupted delivery day in determining whether to modify delivery routes and/or delivery scheduling. In some implementations, delivery routes may be defined to be shorter than typical delivery routes so that less product orders have to be picked and loaded into a delivery vehicle before it can leave to implement the delivery route. Further, the shorter delivery routes allow workers at the shopping facility to continue picking remaining delivery orders while the delivery vehicle is implementing the shortened delivery route. In many instances, workers at the shopping facility may pick the products for each of the halted deliveries prior to or after the interruption condition exists and/or is identified. For example, when the interruption condition is defined at 3:00 AM on a Tuesday, workers may already be at the shopping facility and performing the picking for the deliveries that are being halted on that Tuesday. As such, additional picking on Wednesday would not have to be performed to prepare for the deliveries on the subsequent non-interrupted delivery day (i.e., Wednesday in this example). However, the interruption event may be been defined at 8:00 PM on Monday, and workers may be unable to safely get to the shopping facility to perform the picking for the scheduled Tuesday deliveries. As such, additional picking will be needed to prepare for the previously scheduled deliveries and the rescheduled deliveries of the subsequent non-interrupted delivery day. Because of the additional picking requirements and/or the ability of workers to be available to perform the picking, all of the delivery orders may not be fully picked and ready to be loaded onto a delivery vehicle.

The product picking scheduling system 116 and/or delivery scheduling system 102 can, in some applications, attempt to compensate for the incomplete picking by limiting orders to be routed and directing the delivery routing system 112 to modify delivery routes and the number of deliveries to be performed prior to the delivery vehicle returning to the shopping facility. Often, on days when a previous day was not interrupted, delivery vehicles are each loaded with all of the products scheduled to be delivered by that delivery vehicle for that day, and the delivery vehicles may not return to the shopping facility until they are finished with their deliveries for the day. However, when the product orders have not been fully picked and prepared to be loaded, the delivery vehicles would have to wait until the orders are fully picked. Alternatively, some embodiments modify the delivery routes of one or more delivery vehicles to define multiple sub-routes with the delivery vehicle returning to the shopping facility between the sub-routes. This allows workers at the shopping facility to continue picking delivery orders that are intended for a subsequent sub-route of one or more delivery vehicles.

In some embodiments, the product picking scheduling system 116 and/or delivery scheduling system 102 can identify that at least a threshold quantity of product deliveries and/or products, which are to be picked at the shopping facility for at least the multiple halted product deliveries, are yet to be picked and/or are not prepared to be loaded onto a delivery vehicle by a threshold period of time prior to a scheduled departure of the delivery vehicle on the subsequent non-interrupted delivery day of one or more delivery vehicles. Typically, the delivery scheduling system 102 further considers other previously scheduled deliveries that were scheduled for delivery on the subsequent non-interrupted day prior to blocking further delivery reservations, and whether a threshold quantities of these product deliveries have additionally been picked and/or are ready to be loaded within the threshold period of time. The threshold quantities of product deliveries may vary depending on one or more factors such as but not limited to the threshold period of time, expected pick rates, number of workers performing the picking, number of workers available to perform the picking, quantity of delivery orders, quantity of products in each of the delivery orders, total quantity of products remaining to be picked, types of products to be picked, locations within the shopping facility from where products are to be pick, other such parameters, and typically a combination of two or more of such parameters. In some instances, the threshold quantities of product deliveries may be all of the product deliveries scheduled to be delivered on the subsequent non-interrupted delivery day, which again may be dependent on the threshold time.

Instructions can be issued to define a set of picking schedules that at least one worker is to sequentially follow in picking products to be delivered according to at least the halted product deliveries, and typically all delivery orders for the subsequent non-interrupted day. The delivery scheduling system 102 and/or delivery routing system 112 can identify a portion of the product deliveries scheduled for the non-interrupted delivery day that are to be grouped and delivered before returning to the shopping facility to retrieve additional products to be delivered, and issue instructions that cause one or more picking schedules to direct an appropriate order for one or more workers to follow in collecting those products.

One or more further groupings of deliveries can be defined and corresponding picking schedules generated to direct the picking according to those further groupings. For example, the a set of deliveries scheduled for the non-interrupted delivery day that are to be delivered by a first delivery vehicle can be divided into a set of three groupings, and a set of picking schedules can direct one or more workers to first pick products for a first group of the deliveries. Once those products are collected and/or loaded onto the delivery vehicle, the workers can then pick products for a second group of the deliveries while the first delivery vehicle is delivering the first group of the deliveries. Similarly, once the products corresponding to the second group of the deliveries are picked and/or loaded, the one or more workers can use one or more of the set of picking schedules to pick products for a third group of the deliveries. Accordingly, the picking is grouped to allow one or more delivery vehicles to start the deliveries even when all of the products to be delivered by that vehicle for the day have not been picked.

Further, the set of picking schedules allows the workers to continue to pick products while the delivery vehicles are delivering products, and to load those onto the vehicles when the delivery vehicles returns between groups of deliveries. The delivery vehicles 128 can communicate status information, location information and other such information to the delivery scheduling system 102 to allow the delivery scheduling system to track the delivery vehicles and coordinate workers at the shopping facility to prepare a subsequent load based on an expected return of the delivery vehicle. The communication with the delivery vehicles may be through a GPS system of the vehicle, a navigation system of the delivery vehicle, and/or other components of the delivery vehicle. Additionally or alternatively, the delivery scheduling system may communicate with a driver's smart phone, tablet, customer electronic device (e.g., device that can scan products and/or totes) or other such user interface unit, such as through an APP, text message, tracking GPS coordinates, a text or call from the driver, other such communication, or combination of two or more of such communications.

Often when workers are picking products, the picked products are grouped or organized according to a particular order for each different customer. The products can be placed in one or more totes, boxes, bags or the like, and labeled to identify the totes, bags, boxes, etc. are part of the same order. In some instances, each order for a particular day is identified with a serial number. Often these numbers may be reused on subsequent days. As such, when there is an interruption condition, there may be some confusion as to whether a tote is part of a halted delivery, or a delivery that was previously scheduled for the non-interrupted delivery day. As such, some embodiments further direct workers to apply a labeling to distinguish between products and/or totes (or boxes, bags, etc.) that part of an interrupted delivery, from those previously scheduled for the non-interrupted delivery day. For example, a "Y" indicator or other distinction (e.g., colored sticker, additional numbering, etc.) can be added to those totes associated with halted deliveries. In other instances, the delivery scheduling system and/or the picking system may, in response to the interruption condition, cause the serial numbering to not repeat but instead continue so that there are not duplicates.

Further instructions can be issued to cause a set of sub-delivery routes to be defined that each correspond to one of the picking schedules such that one or more worker pick products specified in a subsequent second one of the picking schedules while the first delivery vehicle is delivering products picked based on a previous first picking schedule. In some embodiments, the instructions to define the set of sub-delivery routes further instruct that the set of sub-delivery routes comprise routing to cause the first delivery vehicle to return to the shopping facility upon completing a plurality of the set of shortened delivery routes to be loaded with the products picked based on a subsequent one of the set of picking schedules (e.g., return to the shopping facility to be loaded after each but the last sub-delivery route). In some embodiments, the instructions are communicated to the delivery routing system that evaluates the delivery locations, determines routing for each of the sub-delivery routes that correspond to one of multiple groups of deliveries. The grouping may be based on scheduled time of delivery, location, and/or other factors. For example, the delivery routing system may group those deliveries scheduled between 8:00 AM and 10:00 AM; group deliveries scheduled between 10:00 AM and 12:00 PM; group deliveries scheduled between 12:00 PM and 2:00 PM; group the deliveries scheduled between 2:00 PM and 4:00 PM; and group the deliveries scheduled after 4:00 PM. This allows workers until approximate 4:00 (or the time the delivery vehicle is scheduled to leave to deliver the deliveries scheduled after 4:00 PM) to pick the products for the deliveries scheduled after 4:00 PM, while still allowing earlier deliveries to occur. As such, the sub-delivery routes are, in at least some instances, shortened routes that include less deliveries than a typical days deliveries, and typically include a sub-set of the total deliveries that a delivery truck is to perform. Sub-delivery routes can be defined for one or more delivery vehicles for a given delivery day.

In some embodiments, the delivery scheduling system maintains a scheduled delivery database that includes information about scheduled deliveries, such as one or more of order number, products, customer identification, delivery location, delivery route, reserved delivery times, whether the delivery was previously interrupted, a priority of the delivery, and/or other such information. Further, in some instances, the delivery scheduling system 102 maintains a completed transaction database that maintains information amount deliveries that have been completed, and/or the schedule delivery database includes one or more fields corresponding to a delivery completion. The delivery vehicle 128 and/or a user computing device 130 of the delivery worker can communicate one or more notifications of a completion of the delivery that is forwarded to the delivery scheduling system. The delivery scheduling system can maintain the completed transactions in the database, and further notify the product ordering system 114 and/or a payment system to complete the transaction and charge the customer for the purchase. As such, the system avoids charging customers for a product prior to the customer receiving the product.

In some embodiments, the delivery scheduling system 102 communicates with geographically distributed user devices 130 of customers that have had their deliveries interrupted and/or customers that have deliveries scheduled on subsequent non-interrupted days to acquire information about the customers and their availability for rescheduling. In some instances, the user devices 130 implement an APP that can access calendar data, parse internet searches, parse internet sites visited, obtain location information, and/or other such information. Some or all of this collected information can be communicated to the delivery scheduling system to be evaluated by the delivery scheduling system in determining and/or limiting potential times for rescheduling deliveries. One or more rescheduling rules can be applied to evaluate calendar data to identify potential times when a customer is available and/or unavailable. Accordingly to these determined availabilities and/or unavailabilities, the delivery scheduling system can limit those times presented to the customer for rescheduling an interrupted delivery. Similarly, location data may be used to identify that a customer is out of town or a threshold distance from a typical delivery location. Based on this information, the delivery scheduling system can limit the times for rescheduling and/or may direct the communication system to inquire with the customer regarding potentially cancelling the order or rescheduling when the customer is expected to be back (e.g., based on calendar data).

In some embodiments, the user devices 130 may include one or more so-called Internet of Things (IOT) (such as smart phones, tablets, smart TVs, computers, laptops, and so forth). In some instances, the Internet of Things may include network edge elements (i.e., network elements deployed at the edge of a network) and other systems such as but not limited to wearable or carriable devices, vehicles, buildings, and other items that are embedded with electronics, software, sensors, network connectivity, and sometimes actuators that enable these objects to collect and exchange data via the Internet. The Internet of Things allows people and objects pertaining to people to be sensed and corresponding information to be transferred to remote locations via intervening network infrastructure (e.g., network 126). In some case a network edge element is configured to be personally carried by a person. Examples include but are not limited to so-called smart phones, tablets, smart wearable devices (e.g., smart watches, fitness monitors that are worn on the body, etc.). In other cases, the network edge element may be configured to not be personally carried by a person, such as but not limited to smart refrigerators and pantries, entertainment and information platforms, exercise and sporting equipment, digital personal assistant (e.g., home and/or office digital assistances such as Amazon Alexa implemented on an Amazon Echo, Google Assistant implemented on a Google Home, etc.), and other such devices. This can occur when, for example, the network edge element is too large and/or too heavy to be reasonably carried by an ordinary average person, or not configured to easy transport. This can also occur when, for example, the network edge element has operating requirements ill-suited to the mobile environment that typifies the average person.

Some embodiments further evaluate peoples' actions, intentions and history in estimating and/or limiting period of time for rescheduling an interrupted delivery. Data may be received from numerous user devices 130 that identify corresponding individual's actions, intentions, history data, and the like. The data may include calendar data, social media, Internet search parameters, on-line and retail store shopping and/or purchases, and other such data may be detected by one or more Internet of Things. Such data can be communicated to the delivery scheduling system 102 and/or at least partially locally processed on the Internet of Things to identify a corresponding person's actions, intentions, and locations relative to rescheduling. Based on this information, one or more rules may be applied in evaluating potential rescheduling times relevant to a geographic area. For example, the rules may evaluate current and/or forecasted location, appointments, calendar events, and/or other such information.

Further, in some embodiments, the delivery scheduling system 102 communicates with an inventory system 118 associated with the shopping facility from which one or more products are scheduled to be obtained for an interrupted delivery. the delivery scheduling system can obtain inventory data for one or more products to be delivered and utilized in determining available rescheduling times. In instances, one or more products may no longer be available and/or shipment to the retail facility may have been interrupted and thus may not be available and/or not available for an expected period of time (e.g., until a subsequent shipment is received). One or more rules can be applied to evaluate expected sales and/or distribution of the product, available quantities, expected shipments, pending orders, and/or other such factors. The inventory system may maintain and/or access one or more inventory databases maintaining information about products available, expected shipments, sales rates, movement rates, and/or other such information.

Figure 2:
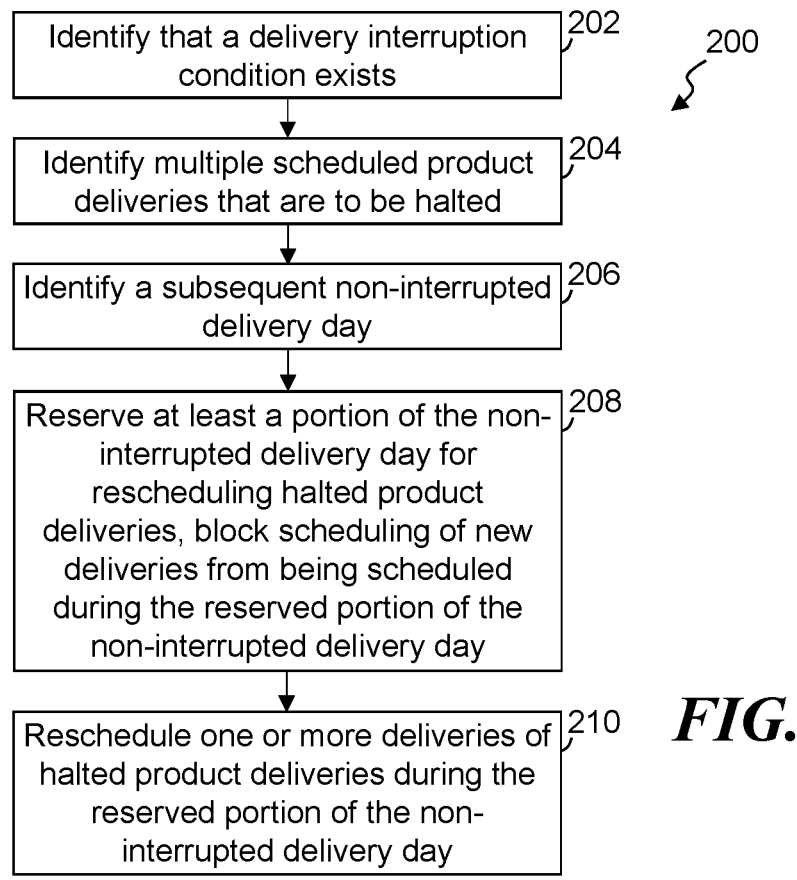
FIG. 2 illustrates a simplified block diagram of an exemplary process of controlling product deliveries, in accordance with some embodiments.

FIG. 2 illustrates a simplified block diagram of an exemplary process 200 of controlling product deliveries, in accordance with some embodiments. In step 202, it is identified, corresponding to one or more retail shopping facilities, that a delivery interruption condition exists for at least a subsequent delivery day. In step 204, multiple scheduled product deliveries are identified that are scheduled to be delivered from the one or more retail shopping facilities on the interrupted delivery day, and that are to be halted as a result of the interruption condition.

In step 206, a subsequent non-interrupted delivery day is identified that occurs in time after the interrupted delivery day. In step 208, at least a portion of the non-interrupted delivery day is reserved to be available to allow customers associated with halted product deliveries to reschedule the halted product deliveries. Further, some embodiments blocks the reserved portion of the non-interrupted delivery day and prevent previously unscheduled deliveries from the one or more shopping facilities from being scheduled during the reserved portion of the non-interrupted delivery day. In step 210, the delivery of one or more of the halted product deliveries are rescheduled during the reserved portion of the non-interrupted delivery day based on communication from a customer corresponding to each of the one or more rescheduled deliveries.

Some embodiments identify first delivery location associated with a customer, and limit delivery times available to the customer in rescheduling the delivery of the halted product delivery to a sub-portion of the reserved portion of the non-interrupted delivery day as a function of the delivery location. In some implementations, a customer may be notified of a delivery time of another delivery previously scheduled for another delivery location that is within a threshold distance of the customer's delivery location. For example, the customer may be notified while the system 100 is receiving the rescheduling of the halted product delivery.

In some embodiments, the system causes a notification to be communicated to a customer associated with each of multiple halted product deliveries, and provides access to a schedule that identifies available times that can be reserved in rescheduling a corresponding one of the halted product deliveries. Some embodiments, in rescheduling the deliveries of one or more halted product deliveries reschedules halted product deliveries without adversely affecting previously scheduled product deliveries that are scheduled for the non-interrupted delivery day and were scheduled prior to identifying that the delivery interruption condition existed. In some instances, this can include avoid cancelling, delaying and/or rescheduling previously scheduled deliveries.

In reserving a portion of the subsequent non-interrupted delivery day to be available to allow customers to reschedule their halted product deliveries, some embodiments determine an amount of the non-interrupted delivery day to be reserved as a function of historic numbers of customers that reschedule halted product deliveries and the number of the multiple halted product deliveries. In some embodiments, the system identifies that at least a threshold quantity of product deliveries, to be picked at a shopping facility for multiple halted product deliveries, are yet to be picked by a threshold period of time prior to a scheduled departure on the non-interrupted delivery day of one or more delivery vehicles. Instructions can be issued to define a set of picking schedules that at least one worker is to sequentially follow in picking products to be delivered according to the halted product deliveries. In some instances, each picking schedule of the set of the picking schedules directs the picking of products for a portion of the products to be delivered on the subsequent non-interrupted delivery day. Some embodiments may further issue instructions to define a set of sub-delivery routes that each correspond to one of the picking schedules such that the at least one worker picks products specified in a subsequent second one of the picking schedules while a delivery vehicle is delivering products picked based on a previous first picking schedule. In some applications, the instructions can include instructions that the set of sub-delivery routes comprise routing to cause a delivery vehicle to return to the shopping facility upon completing each of a plurality of the set of sub-delivery routes to be loaded with the products picked based on a subsequent one of the set of picking schedules.

Figure 3:
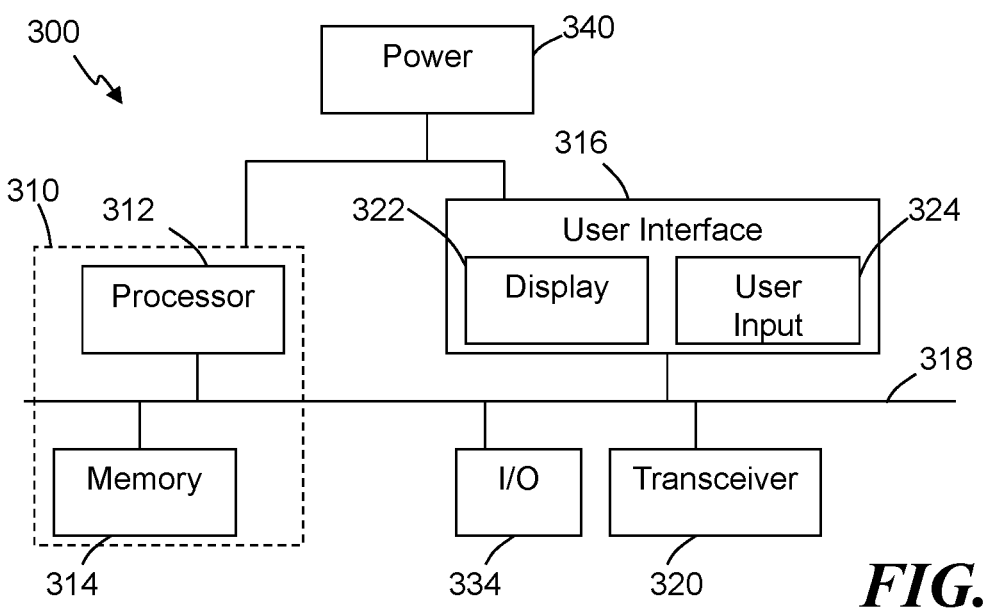
FIG. 3 illustrates an exemplary system for use in implementing methods, techniques, systems, devices, apparatuses, servers, sources and the like in controlling the delivery of products in accordance with some embodiments.

FIG. 3 illustrates an exemplary system 300 that may be used for implementing any of the components, circuits, circuitry, systems, functionality, apparatuses, process, or device of the system 100 of FIG. 1 and/or mentioned above or below, or parts of such circuit, circuitry, functionality, systems, apparatuses, processes, or devices, in accordance with some embodiments. For example, the system 300 may be used to implement the delivery scheduling system 102, cancellation system 104, communication system 106, time reserving system 108, delivery routing system 112, product ordering system 114, product picking scheduling system 116, inventory system 118, and/or other such components, circuitry, functionality and/or devices. However, the use of the system 300 or any portion thereof is certainly not required. Further, one or more of the above described systems may be cooperatively implemented through a single system 300.

By way of example, the system 300 may comprise a control circuit or processor module 312, memory 314, and one or more communication links, paths, buses or the like 318. Some embodiments may include one or more user interfaces 316, and/or one or more internal and/or external power sources or supplies 340. The control circuit 312 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 312 can be part of control circuitry and/or a control system 310, which may be implemented through one or more processors with access to one or more memory 314 that can store code that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 300 may be used to implement one or more of the above or below, or parts of, components, circuits, systems, process and the like. For example, the system may implement the delivery scheduling system 102 with the control circuit being a selection delivery scheduling control circuit, the cancellation system 104 with the control circuit being a cancellation system control circuit, the communication system 106 with the control circuit being a communication system control circuit, the time reserving system 108 with the control circuit being a time reserving control circuit, the delivery routing system 112 with the control circuit being a routing control circuit, the product ordering system 114 with the control circuit being a product ordering control circuit, the product picking scheduling system 116 with the control circuit being a picking scheduling control circuit, the inventory system 118 with the control circuit being an inventor system control circuit, the user devices with the control circuit being a user device control circuit, or other components.

The user interface 316 can allow a user to interact with the system 300 and receive information through the system. In some instances, the user interface 316 includes a display 322 and/or one or more user inputs 324, such as a buttons, touch screen, track ball, keyboard, mouse, etc., which can be part of or wired or wirelessly coupled with the system 300. Typically, the system 300 further includes one or more communication interfaces, ports, transceivers 320 and the like allowing the system 300 to communicate over a communication bus, a distributed computer and/or communication network 126 (e.g., a local area network (LAN), the Internet, wide area network (WAN), etc.), communication link 318, other networks or communication channels with other devices and/or other such communications or combinations thereof. Further the one or more transceivers 320 can include transceivers configured for wired, wireless, optical, fiber optical cable, satellite, or other such communication configurations or combinations of two or more of such communications. Some embodiments include one or more input/output (I/O) ports 334 that allow one or more devices to couple with the system 300. The I/O ports can be substantially any relevant port or combinations of ports, such as but not limited to USB, Ethernet, or other such ports.

The system 300 comprises an example of a control and/or processor-based system with the control circuit 312. Again, the control circuit 312 can be implemented through one or more processors, controllers, central processing units, logic, software and the like. Further, in some implementations the control circuit 312 may provide multiprocessor functionality.

The memory 314, which can be accessed by the control circuit 312, typically includes one or more processor readable and/or computer readable media accessed by at least the control circuit 312, and can include volatile and/or nonvolatile media, such as RAM, ROM, EEPROM, flash memory and/or other memory technology. Further, the memory 314 is shown as internal to the control system 310; however, the memory 314 can be internal, external or a combination of internal and external memory. Similarly, some or all of the memory 314 can be internal, external or a combination of internal and external memory of the control circuit 312. The external memory can be substantially any relevant memory such as, but not limited to, solid-state storage devices or drives, hard drive, universal serial bus (USB) stick or drive, flash memory secure digital (SD) card, other memory cards, and other such memory or combinations of two or more of such memory. The memory 314 can store code, software, executables, scripts, data, content, lists, programming, programs, log or history data, user information and the like. While FIG. 3 illustrates the various components being coupled together via a bus, it is understood that the various components may actually be coupled to the control circuit and/or one or more other components directly.

Some embodiments include the I/O interface 334 that allows wired and/or wireless communication coupling of to external components, such as with one or more delivery scheduling systems, delivery routing systems, product ordering systems, product picking scheduling systems, inventory systems, databases, third party services, and other such devices or systems. Typically, the I/O interface provides wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, brick and mortar retail facilities have a delivery control system to control product deliveries based on an interruption condition, and comprises: a delivery scheduling system; a cancellation system communicatively coupled with the delivery scheduling system, and configured to identify schedules deliveries; and a time reserving system communicatively coupled with at least the delivery scheduling system; wherein the delivery scheduling system comprises a delivery scheduling control circuit configured identify, corresponding to a first retail shopping facility, that a delivery interruption condition exists for at least a subsequent first delivery day, wherein the interruption condition comprises a condition that makes it unsafe to perform product deliveries on the first delivery day; wherein the cancellation system is configured to identify multiple scheduled product deliveries, scheduled to be delivered from the first retail shopping facility on the first delivery day, that are to be halted as a result of the interruption condition; wherein the time reserving system is configured to: receive notification of the interruption of the first delivery day and apply one or more time reserving rules to identify a non-interrupted second delivery day that occurs in time after the first delivery day; and reserve at least a portion of the second delivery day to be available to allow customers associated with halted product deliveries to reschedule the halted product deliveries, and block the reserved portion of the second delivery day and prevent previously unscheduled deliveries associated with the first shopping facility from being scheduled during the reserved portion of the second delivery day; and wherein the delivery scheduling control circuit is configured to reschedule a delivery of at least a first halted product delivery during the reserved portion of the second delivery day based on communication from a first customer.

Some embodiments provide systems to control product deliveries. These systems include a transceiver configured to communicatively couple with a distributed computer network; a delivery scheduling control circuit coupled with the transceiver; memory coupled to the delivery scheduling control circuit and storing computer instructions that when executed by the delivery scheduling control circuit cause the delivery scheduling control circuit to: identify, corresponding to a first retail shopping facility, that a delivery interruption condition exists for at least a subsequent first delivery day, wherein the interruption condition comprises a condition that makes it unsafe to perform product deliveries on the first delivery day; identify multiple scheduled product deliveries, scheduled to be delivered from the first retail shopping facility on the first delivery day, that are to be halted as a result of the interruption condition; identify a non-interrupted second delivery day that occurs in time after the first delivery day; reserve at least a portion of the second delivery day to be available to allow customers associated with halted product deliveries to reschedule the halted product deliveries, and block the reserved portion of the second delivery day and prevent previously unscheduled deliveries associated with the first shopping facility from being scheduled during the reserved portion of the second delivery day; and reschedule a delivery of at least a first halted product delivery during the reserved portion of the second delivery day based on communication from a first customer.

Further, some embodiments provide methods of controlling product deliveries, comprising: by a delivery scheduling control circuit: identifying, corresponding to a first retail shopping facility, that a delivery interruption condition exists for at least a subsequent first delivery day, wherein the interruption condition comprises a condition that makes it unsafe to perform product deliveries on the first delivery day; identifying multiple scheduled product deliveries, scheduled to be delivered from the first retail shopping facility on the first delivery day, that are to be halted as a result of the interruption condition; identifying a non-interrupted second delivery day that occurs in time after the first delivery day; reserving at least a portion of the second delivery day to be available to allow customers associated with halted product deliveries to reschedule the halted product deliveries, and block the reserved portion of the second delivery day and prevent previously unscheduled deliveries associated with the first shopping facility from being scheduled during the reserved portion of the second delivery day; and rescheduling a delivery of at least a first halted product delivery during the reserved portion of the second delivery day based on communication from a first customer.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A delivery control system to control product deliveries based on an interruption condition, comprising:
   a delivery scheduling system comprising a plurality of scheduling processors communicatively coupled over a distributed network and geographically distributed over multiple different geographic areas;
   a cancellation system comprising a plurality of cancellation processors communicatively coupled over the distributed network and geographically distributed over the network, wherein the cancellation system is communicatively coupled over the network with the delivery scheduling system, and configured to identify scheduled deliveries; and
   a time reserving system comprising a plurality of reserving processors communicatively coupled over the network and geographically distributed over the network, wherein the time reserving system is communicatively coupled over the network with at least the delivery scheduling system;
   wherein the delivery scheduling system comprises a delivery scheduling control circuit implemented through one or more of the scheduling processors, wherein the scheduling control circuit is configured to access and apply a set of one or more cancellation rules to a plurality of sets of different conditions corresponding to the different geographic areas and identify, corresponding to a first retail shopping facility, that a delivery interruption condition exists for at least a subsequent first delivery day, wherein the interruption condition comprises a condition that makes it unsafe to perform product deliveries on the first delivery day;
   wherein the cancellation system is configured to access and apply one or more of the cancellation rules to identify multiple scheduled product deliveries, scheduled to be delivered from the first retail shopping facility on the first delivery day, that are to be halted as a result of the interruption condition;
   wherein the time reserving system accesses and applies a set of one or more time reserving rules and is configured to:
      receive notification of the interruption of the first delivery day and apply one or more of the time reserving rules to identify a non-interrupted second delivery day that occurs in time after the first delivery day;
      evaluate, based on the set of one or more time reserving rules, historic data;
      reserve at least a portion of the second delivery day to be available to allow customers associated with halted product deliveries to reschedule the halted product deliveries, wherein the portion of the second delivery date that is reserved is based on historic numbers of customers that reschedule halted product deliveries relative to a corresponding number of the halted product deliveries, and block the reserved portion of the second delivery day and prevent previously unscheduled deliveries associated with the first shopping facility from being scheduled during the reserved portion of the second delivery day; and
   wherein the delivery scheduling control circuit is configured to reschedule a delivery of at least a first halted product delivery during the reserved portion of the second delivery day based on communication from a first customer;
   wherein the time reserving system, in reserving at least the portion of the second delivery day to be available to allow the customers to reschedule the halted product deliveries, determines an amount of the second delivery day to be reserved as a function of historic numbers of customers that reschedule halted product deliveries and the number of the multiple halted product deliveries;
   wherein the time reserving system identifies types of products likely to be in more demand based on a type of interruption event, assign a greater weight to those interrupted deliveries that include one or more of the identified types of products as more likely to be rescheduled as soon as possible; and
   wherein the delivery scheduling system communicates with geographically distributed user devices each associated with one of a set of multiple different customers that have had their deliveries interrupted, accesses calendar data from the user devices, determines for each customer of the set of multiple different customers an availability for rescheduling, and applies one or more scheduling rules and limits potential available times presented to a respective one of the set of multiple different customers for rescheduling based on the determined availability for the respective customer.

2. The system of claim 1, wherein the delivery scheduling control circuit identifies a first delivery location associated with the first customer, and limits delivery times available to the first customer in rescheduling the delivery of the first halted product delivery to a sub-portion of the reserved portion of the second delivery day as a function of the first delivery location.

3. The system of claim 2, wherein the delivery scheduling control circuit causes a notification to be communicated to first customer, while receiving the rescheduling of the first halted product delivery, of a delivery time of a second delivery previously scheduled for a second delivery location that is within a threshold distance of the first delivery location.

4. The system of claim 2, further comprising:
a communication system communicatively coupled with the delivery scheduling system and configured to implement a communication of a notification to a customer associated with each of the multiple halted product deliveries, and provides access to a schedule that identifies available times that can be reserved in rescheduling a corresponding one of the halted product deliveries.

5. The system of claim 1, wherein the delivery scheduling control circuit in rescheduling the delivery of at least the first halted product delivery is configured to reschedule the delivery of the first halted product delivery without delaying previously scheduled product deliveries that are scheduled for the second delivery day and were scheduled prior to the identifying that the delivery interruption condition existed.

6. The system of claim 1, wherein the delivery scheduling control circuit:
identifies that at least a threshold quantity of product deliveries, to be picked at the first shopping facility for the multiple halted product deliveries, are yet to be picked by a threshold period of time prior to a scheduled departure on the second delivery day of at least a first delivery vehicle;
issues instructions to define a set of picking schedules that at least one worker is to sequentially follow in picking products to be delivered according to the halted product deliveries, wherein each picking schedule of the set of the picking schedules directs the picking of products for a portion of the products to be delivered on the second delivery day; and
issues instructions to define a set of sub-delivery routes that each correspond to one of the picking schedules such that the at least one worker picks products specified in a subsequent second one of the picking schedules while the first delivery vehicle is delivering products picked based on a previous first picking schedule.

7. The system of claim 6, wherein the delivery scheduling control circuit in issuing the instructions to define the set of sub-delivery routes issues instructions that the set of sub-delivery routes comprise routing to cause the first delivery vehicle to return to the first shopping facility upon completing each of a plurality of the set of sub-delivery routes to be loaded with the products picked based on a subsequent one of the set of picking schedules.

8. The system of claim 1, wherein the delivery scheduling system further receives from the user devices location data, and applies the one or more scheduling rules to limit potential available times presented to the respective one of the set of customers for rescheduling based on the location information.

9. The system of claim 1, wherein the delivery scheduling system is further configured to:
evaluate a state of preparation of products for each delivery scheduled for the subsequent non-interrupted second delivery day;
determine, based on the state of preparation of the products, whether to modify delivery routes;
modify the delivery routes to reduce product orders to be picked and loaded into a delivery vehicle before the delivery vehicle leaves to implement the delivery route; and
direct workers to apply a labeling to distinguish between products that part of an interrupted delivery, from those previously scheduled for the non-interrupted second delivery day.

10. A method of controlling deliveries based on an interruption condition, comprising:
accessing, by a delivery scheduling control circuit of a delivery scheduling system comprising a plurality of scheduling processors communicatively coupled over a distributed network and geographically distributed over multiple different geographic areas, a set of one or more cancellation rules;
applying one or more of the set of cancellation rules to a plurality of sets of different conditions corresponding to the different geographic areas and identifying, corresponding to a first retail shopping facility, that a delivery interruption condition exists for at least a subsequent first delivery day, wherein the interruption condition comprises a condition that makes it unsafe to perform product deliveries on the first delivery day, wherein the cancellation system comprises a plurality of cancellation processors communicatively coupled over a distributed network and geographically distributed over multiple different geographic areas;
accessing and applying, by a cancellation system comprises a plurality of cancellation processors communicatively coupled over the distributed network and geographically distributed over the multiple different geographic areas, of the one or cancellation rule and identifying multiple scheduled product deliveries, scheduled to be delivered from the first retail shopping facility on the first delivery day, that are to be halted as a result of the interruption condition;
accessing and applying, by a time reserving system comprising a plurality of reserving processors communicatively coupled over the network and geographically distributed over the network, a set of one or more time reserving rules and identifying a non-interrupted second delivery day that occurs in time after the first delivery day;
evaluating, based on the set of one or more time reserving rules, historic data;
reserving at least a portion of the second delivery day to be available to allow customers associated with halted product deliveries to reschedule the halted product deliveries, wherein the portion of the second delivery date that is reserved is based on historic numbers of customers that reschedule halted product deliveries relative to a corresponding number of the halted product deliveries, and block the reserved portion of the second delivery day and prevent previously unscheduled deliveries associated with the first shopping facility from being scheduled during the reserved portion of the second delivery day;

rescheduling a delivery of at least a first halted product delivery during the reserved portion of the second delivery day based on communication from a first customer;

wherein the reserving at least the portion of the second delivery day to be available to allow the customers to reschedule the halted product deliveries comprises determining an amount of the second delivery day to be reserved as a function of historic numbers of customers that reschedule halted product deliveries and the number of the multiple halted product deliveries;

identifying types of products likely to be in more demand based on a type of interruption event, assign a greater weight to those interrupted deliveries that include one or more of the identified types of products as more likely to be rescheduled as soon as possible; and communicating with geographically distributed user devices each associated with one of a set of multiple different customers that have had their deliveries interrupted, accessing calendar data from the user devices, determining for each customer of the set of multiple different customers an availability for rescheduling, and applying one or more scheduling rules and limiting potential available times presented to a respective one of the set of multiple different customers for rescheduling based on the determined availability for the respective customer.

11. The method of claim 10, further comprising:
identifying a first delivery location associated with the first customer; and
limiting delivery times available to the first customer in rescheduling the delivery of the first halted product delivery to a sub-portion of the reserved portion of the second delivery day as a function of the first delivery location.

12. The method of claim 11, further comprising:
notifying, while receiving the rescheduling of the first halted product delivery, the first customer of a delivery time of a second delivery previously scheduled for a second delivery location that is within a threshold distance of the first delivery location.

13. The method of claim 11, further comprising:
causing a notification to be communicated to a customer associated with each of the multiple halted product deliveries; and
providing access to a schedule that identifies available times that can be reserved in rescheduling a corresponding one of the halted product deliveries.

14. The method of claim 10, wherein the rescheduling the delivery of at least the first halted product delivery comprises rescheduling the delivery of the first halted product delivery without delaying previously scheduled product deliveries that are scheduled for the second delivery day and were scheduled prior to the identifying that the delivery interruption condition existed.

15. The method of claim 10, further comprising:
identifying that at least a threshold quantity of product deliveries, to be picked at the first shopping facility for the multiple halted product deliveries, are yet to be picked by a threshold period of time prior to a scheduled departure on the second delivery day of at least a first delivery vehicle;
issuing instructions to define a set of picking schedules that at least one worker is to sequentially follow in picking products to be delivered according to the halted product deliveries, wherein each picking schedule of the set of the picking schedules directs the picking of products for a portion of the products to be delivered on the second delivery day; and
issuing instructions to define a set of sub-delivery routes that each correspond to one of the picking schedules such that the at least one worker picks products specified in a subsequent second one of the picking schedules while the first delivery vehicle is delivering products picked based on a previous first picking schedule.

16. The method of claim 15, wherein the issuing the instructions to define the set of sub-delivery routes comprises issuing instructions that the set of sub-delivery routes comprise routing to cause the first delivery vehicle to return to the first shopping facility upon completing each of a plurality of the set of sub-delivery routes to be loaded with the products picked based on a subsequent one of the set of picking schedules.

* * * * *

UNITED STATES PATENT AND TRADEMARK OFFICE
CERTIFICATE OF CORRECTION

PATENT NO. : 10,679,170 B2  
APPLICATION NO. : 15/581294  
DATED : June 9, 2020  
INVENTOR(S) : Putcha et al.

Page 1 of 1

It is certified that error appears in the above-identified patent and that said Letters Patent is hereby corrected as shown below:

On the Title Page

In the Abstract, at Line 6, insert --to-- after "configured".

In the Claims

At Column 22, Line 21, in Claim 9, insert --are-- after "that".

At Column 22, Lines 44-45, Claim 10, delete "comprises" and replace with --comprising--.

At Column 22, Line 48, Claim 10, delete "the one or cancellation rule" and replace with --the one or more of the set of cancellation rules--.

Signed and Sealed this  
First Day of December, 2020

Andrei Iancu  
*Director of the United States Patent and Trademark Office*